Sept. 16, 1947.     J. R. PATTEE     2,427,571
MAGNETIC STRUCTURES FOR ELECTRICAL INSTRUMENTS
Filed May 4, 1943
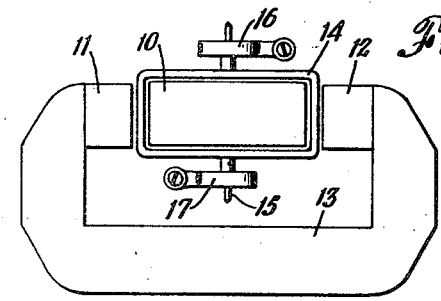
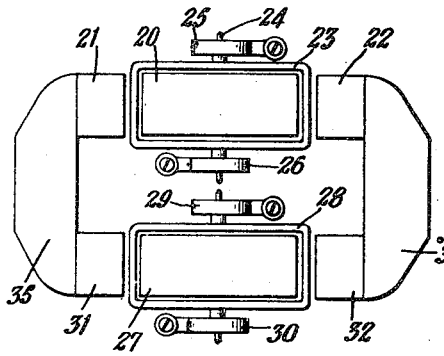
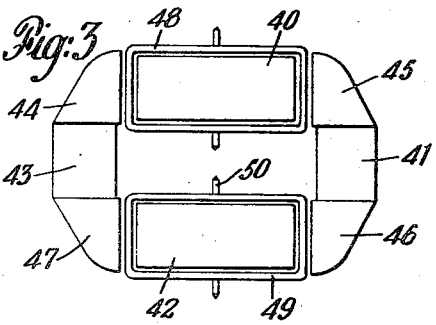
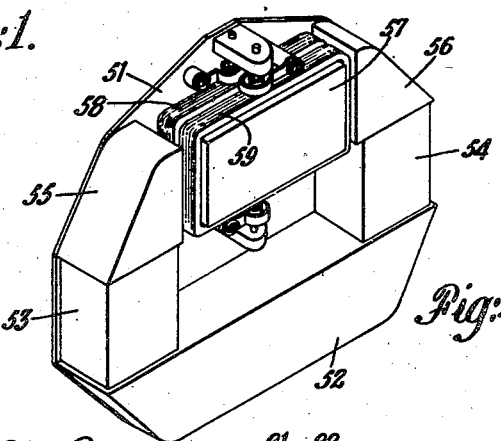
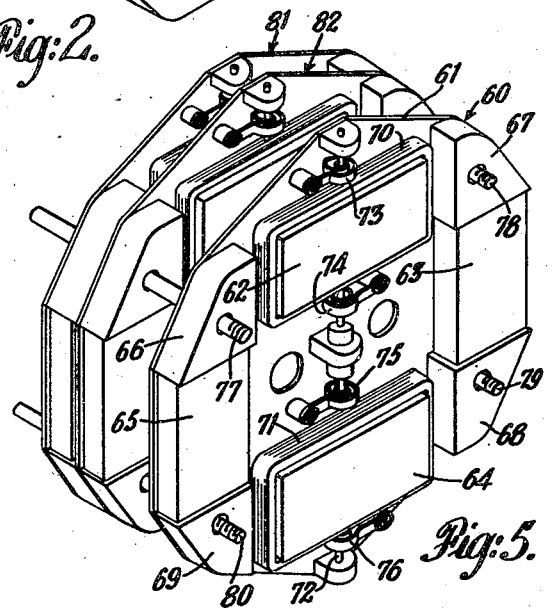
INVENTOR
JOHN R. PATTEE
BY E. C. Sanborn
ATTORNEY Patented Sept. 16, 1947

2,427,571

UNITED STATES PATENT OFFICE 2,427,571

MAGNETIC STRUCTURE FOR ELECTRICAL INSTRUMENTS

John R. Pattee, Waterbury, Conn., assignor to The Bristol Company, Waterbury, Conn., a corporation of Connecticut Application May 4, 1943, Serial No. 485,581

2 Claims. (Cl. 171—95)

This invention relates to magnetic structures for electrical measuring apparatus, and more especially to a structure wherein efficient use may be made of the properties of high coercive force in magnetic materials in providing a field for galvanometers or millivoltmeters of the permanent-magnet moving-coil, or d'Arsonval type, or for damping elements in deflecting instruments, or for braking systems in watt-hour meters and the like.

In the design of magnetic circuits for instruments wherein a conductor is caused to move in a relatively short air-gap, the problem of proportioning the dimensions of the permanent magnet circuit to those of the ferromagnetic portions and of the air-gap is dominated primarily by the characteristics of the material constituting the permanent magnet. With the magnet steels which were in common use prior to the development of high coercive force materials, it was necessary that the length of the magnet be relatively great with respect to its cross section; and this characteristic is reflected in the design of the earlier instruments and materials utilizing such steels. The development of modern magnetic materials, however, has resulted in a complete change in the relative proportions of magnets in order to obtain optimum results.

Because of the relatively high cost of modern magnetic materials as compared with the earlier steels, it is important that such materials be utilized to a maximum efficiency, and that all parts of the magnetic circuit be so constructed as to make the best use of the available flux. In many modern galvanometers, especially those intended for use in aviation instruments, it is essential, moreover, that the weight of the whole instrument be kept at a minimum; and that its assembly be reduced to the smallest possible dimensions.

It is an object of the present invention to provide a magnetic circuit wherein efficient use may be made of energy-producing magnetic material.

It is a further object to provide a magnetic structure in which the flux density throughout the energy-producing material shall be substantially constant.

It is a further object to provide for the efficient utilization of different classes of energy-producing magnetic materials without departure from standard physical proportions.

It is a further object to provide an arrangement which will utilize said energy-producing materials in parts having easily fabricated simple shapes.

It is a further object to provide a galvanometer having a plurality of moving coils adapted for use either individually or in circuits involving interconnection of said coils.

It is a further object to provide a magnetic structure in which an increase in the number of moving coils will be represented by a proportionately smaller increase in the volume of energy producing material.

It is a further object to provide a construction readily adaptable to the grouping of individual similar galvanometer units in a single compact composite assembly, and in a manner that the interaction of the magnetic circuits of said units will tend to mutual reinforcement of field strength in their respective air-gaps.

It is a further object to provide a circuit arrangement in which the magnetic leakage will be reduced to a minimum, and the volume of magnetic fields outside the air-gaps and ferro-magnetic elements restricted to the least possible magnitude.

In the accompanying drawings:

Fig. 1 is a side elevation of a single-coil galvanometer constructed in accordance with the principles of the invention.

Fig. 2 is a side elevation of a galvanometer constructed according to the principles of the invention and having two moving coils disposed in air-gaps magnetically in series.

Fig. 3 is a side elevation of a galvanometer of the double-coil type embodying certain modifications from the form shown in Fig. 2.

Fig. 4 is a perspective view of a galvanometer constructed according to the principles of the invention, and having two independent moving coils disposed in air-gaps magnetically in parallel.

Fig. 5 illustrates the manner in which a plurality of galvanometers of the type shown in Fig. 3 may be combined in a composite unit.

Referring now to Fig. 1 of the drawings, the numeral 10 designates a stationary rectangular block of Alnico, or similar high-coercive-force magnetic material, disposed with its greatest length in a horizontal direction as seen in the drawings. Juxtaposed to the ends of the block 10, but separated therefrom by spaces to form air-gaps, are two shorter blocks 11 and 12 of material similar to that of the block 10 and adapted to form a continuation of a magnetic circuit including the block 10 and the intervening air-gaps. A U-shaped yoke 13 formed of ferromagnetic material, and in intimate magnetic contact with the ends of the blocks 11 and 12 remote from the air-gaps serves to complete the magnetic circuit. A movable coil 14, surrounding the block 10 at its greatest dimensions, is pivoted about an axis 15 lying in the median plane of the block 10 and is free for limited deflection about said axis with the axially extended portions of its winding lying in said air-gaps. Flexible leading-in springs 16 and 17 provide a connection between the winding of said coil and an external circuit, and also serve to constrain said coil in a definite position of deflection about the axis 15.

Upon the blocks 10, 11, and 12 being suitably magnetized, to add their magnetomotive forces about the magnetic circuit, the structure set forth constitutes a permanent-magnet moving-coil, or d'Arsonval, galvanometer, in which the coil 14 will tend to be angularly deflected about the axis 15 in a direction and to an extent depending on the direction and intensity of an electric current passing through said coil between the springs 16 and 17. The principles of the most efficient use of magnetic material as hereinbefore set forth, are practically applied in the design shown in Fig. 1 by virtue of the fact that the energy-producing magnetic material is located immediately adjacent the air-gaps in the magnetic circuit, the yoke 13 serving to complete the magnetic circuit and having a negligible magnetic potential between its ends.

In Fig. 2 is shown an application of the basic principle of design to a galvanometer having two independent movable coils, each in its own air-gap, said air-gaps being magnetically in series. A block 20 of Alnico or similar energy-producing material has spaced from its extremities two shorter blocks 21 and 22 of magnetic energy-producing material, providing air-gaps at the extremities of the block 20. A movable coil 23 surrounds the block 20, and is pivoted for rotation about an axis 24 lying in the median plane of the block 20, and is fitted with leading-in springs 25 and 26, the whole constituting a galvanometer unit similar to that shown in Fig. 1 but with an incomplete magnetic circuit.

A structure, similar in all respects to that just described, is formed by a block 27 of magnetic energy-producing material surrounded by a movable coil 28 with leading-in springs 29 and 30 and juxtaposed shorter blocks 31 and 32 of energy-producing material. The two partial galvanometer structures as hereinabove described are brought into adjacent relationship. The ends of the short blocks 21 and 31 are bridged by a yoke 35 of ferromagnetic material, and the ends of the blocks 22 and 32 are similarly bridged by a yoke 36 of ferromagnetic material. There is thus provided a complete magnetic structure having two sets of air-gaps and two moving coils, the energy-producing material being immediately adjacent the air-gaps. If the several blocks of energy-producing material be magnetized in the same sense around the rectangle formed by the magnetic circuit, the flux will be continuous about the circuit; and because of the low magnetic potentials existing in the yokes 35 and 36, leakage through the surrounding air will have a minimum value.

In Fig. 3 is shown a modification of the design of magnetic circuit illustrated in Fig. 2 and embodying an alternative arrangement of parts. While the highest magnetic efficiency is known to be obtained when the sections of energy-producing material are directly juxtaposed to the air gaps, it has been found that by an alternative arrangement there may be effected a considerable reduction of weight in the total assembly without a proportional lowering of the efficiency of the magnetic circuit. This feature is important where galvanometers of this type are to be used in connection with aviation work. Four pieces of energy-producing material 40, 41, 42, and 43 are arranged in a rectangular formation; and in intimate magnetic contact with the ends of the two of the oppositely located pieces 41 and 43 are placed ferromagnetic elements 44, 45, 46, and 47, disposed as shown with respect to various parts of energy-producing material and providing air-gaps between said pole pieces and the extremities of the energy-producing elements 40 and 42. Movable coils 48 and 49 disposed about the magnets 40 and 42, and each free to swing through a limited angle about an axis, such as indicated at 50, provide the elements of a double-coil galvanometer similar to that shown in Fig. 3. It will be obvious, however, that since energy-producing material in the form shown in Fig. 3 constitutes a higher proportion of the metallic part of the magnetic circuit than in the form shown in Fig. 2, the total weight of the magnetic structure will be less in proportion to the available energy; and experience has shown that the gain so obtained more than offsets the slight decrease in efficiency of utilization of the flux consequent upon the interposition of ferromagnetic material between the magnets and the air-gap.

Fig. 4 is a perspective view of a double coil galvanometer embodying the principles of the invention and constructed in such a manner that the two movable coils operate in air-gaps which are magnetically in parallel. A mounting plate 51 carries a horizontally disposed ferromagnetic yoke 52, near the extremities of which are placed two vertically disposed blocks 53 and 54 of high-coercive-force material in intimate magnetic contact with the upper lateral face of the yoke 52. In contact with the upper ends of the blocks 53 and 54 are placed pole pieces 55 and 56 formed of suitable ferro-magnetic material, and having inwardly directed and oppositely disposed pole faces. Positioned between said pole pieces and separated at its extremities from both the same by similar airgaps, is a block 57 of high-coercive-force material. The blocks 53, 54, and 57 are magnetized in a similar sense about the magnetic circuit so formed, the three magnetic elements thus combining their forces to provide a flux in the air-gaps. In the design shown in Fig. 4 the various elements of the magnetic path are made twice as thick as the corresponding elements illustrated in the foregoing drawings. By using suitably narrow coils, it is thus made possible to place in the air-gaps two similar coils 58 and 59, said coils being adapted for deflection independently about parallel axes lying in the median plane of the block 57. There has thus been provided a galvanometer structure in which two moving coils share a common air-gap and are available for independent deflection in response to electrical currents passed through their windings. The advantages accruing to an arrangement of this type as compared to one having provision only for a single coil will hereinafter be set forth.

In Fig. 5 is shown the manner in which a number of galvanometer elements similar to that diagrammatically indicated in Fig. 3 may be mechanically combined into an integral structure, with a consequent improvement in their individual operating characteristics. A galvanometer element 60 similar to that illustrated in Fig. 3 comprises a vertical mounting plate 61 having fixed thereto magnets 62, 63, 64, and 65. Intimately secured to the ends of the vertically disposed magnets 63 and 65 are blocks of ferromagnetic material 66, 67, 68 and 69 providing pole pieces for said magnets and forming with the horizontally disposed magnets 62 and 64 air-gaps in which are mounted movable coils 70 and 71, each adapted for deflection through a limited angle about pivots lying on a common axis 72 located in the median plane of the magnets 62 and 63. Spiral leading-in springs 73, 74, 75 and 76 provide electrical connection between the windings of the coils 70 and 71 and an external circuit, and also serve to constrain the deflections of said coils about their axis of rotation. Through the pole pieces 66, 67, 68 and 69 are drilled openings adapted to receive threaded bolt or stud members 77, 78, 79 and 80. Similar galvanometer elements 81 and 82, identical in all mechanical features with the galvanometer 60 may be placed with their openings in their pole pieces in alignment with those of the galvanometer 60, when they may be clamped into an integral structure by means of suitable nuts not shown in the drawings.

It will be obvious that the construction of the galvanometer units in relatively flat and thin conformation, and the provision of means for assembling any desired number of such units into an integral structure with a common mounting promotes both compactness and lightness in the completed instrument. A further advantage accruing to the assembly of similar magnetic systems in a manner to bring equipotential points into close juxtaposition is found in the substantial reduction of magnetic leakage and "fringing," the latter phenomenon being especially characteristic of the high-reluctance portions of the magnetic circuit, that is to say, the air-gaps. If the air-gap of a magnet be reinforced by a parallel field having a potential distribution identical with that of the air-gap, that portion of the flux which would normally be diverted to form a "fringe" will be constrained to pass through the air-gap, where it becomes available for coaction with the current in the winding of the moving coil. Thus, upon the assembly of a plurality of similar galvanometer elements in the manner shown in Fig. 5, the efficiency of utilization of available flux in all the elements will be improved, and "fringing" restricted to the outer faces of the outer units of the assembly. In addition to reduced cost, due to the smaller number of parts employed, the galvanometer arrangement shown in Fig. 4, wherein two coils are magnetically in parallel, possesses in common with the composite structure shown in Fig. 5 the advantage of increased efficiency of flux utilization consequent upon the justaposition of similar magnetic circuits.

The drawings depicting the several forms of galvanometers heretofore referred to in the specification illustrate no means for utilizing the deflections of the movable coils. While the principles of the invention are applicable to forms of galvanometers having a wide angular deflection, they are especially adapted to those in which the significant position of the movable element is that corresponding to a zero deflection from neutral. The moving element of any of the embodiments under discussion may be fitted with a pointer, a mirror, electrical contacts, or other exhibiting or control devices well known to those versed in the art; but in the interest of simplicity of representation and clarity of description, these have been omitted from the specification as forming no part of the present invention.

It has been noted that the assembly of similar magnetic systems illustrated in Fig. 5 achieves substantial reduction of magnetic leakage and "fringing." Through the provision of suitable mating surfaces of the individual units shown in Fig. 5, stacking is facilitated and mutual shielding against stray flux is attained; with the result that a desirable uniforming of flux density through the permanent magnet material is more nearly achieved.

While the foregoing description has shown the application of the principles of the invention to the magnetic system of a galvanometer having one or more movable coils adapted for limited deflection in an air-gap, it will be apparent that the principles may be similarly and advantageously applied to the design of the drag magnet system of a watt-hour meter, to the damping system of an indicating instrument, or to any magnetic structure wherein it is desired to provide in an air-gap a field derived from a high-coercive-force magnetic material.

Having described my invention what I claim is:

1. Electrical apparatus comprising permanent magnet means, a plurality of independent coils surrounding said permanent magnet means, a second permanent magnet means, a plurality of independent coils surrounding said second permanent magnet means, and means external to all of said coils and cooperating with the permanent magnet means thereof for providing magnetic circuits in series through said permanent magnet means and in parallel through the respective coils on each of said permanent magnet means, said external means comprising magnetically permeable means having portions juxtaposed to portions of the coils on opposite sides of said permanent magnet means to form with each of said permanent magnet means air-gaps for the passage of magnetic flux in parallel through said coils, and said external means including permanent magnet material for generating flux for passage through said gaps.

2. Electrical apparatus as set forth in claim 1, wherein the permanent magnet material in said external means comprises blocks of said material, said external means also comprising pole-pieces of ferro-magnetic material between said permanent magnet blocks and the respective sets of coils, said pole-pieces being juxtaposed to said coils for the passage of magnetic flux through said air-gaps.

JOHN R. PATTEE.

REFERENCES CITED

The following references are of record in the file of this patent:

UNITED STATES PATENTS

| Number | Name | Date |
| --- | --- | --- |
| 2,295,082 | Jonas | Sept. 8, 1942 |
| 2,102,409 | Faus | Dec. 14, 1937 |
| 2,110,418 | Green | Mar. 8, 1938 |
| 2,309,927 | Beede | Feb. 2, 1943 |
| 627,908 | Davis et al. | June 27, 1899 |
| 1,847,936 | Faus | Mar. 1, 1932 |
| 1,920,764 | Nickle | Aug. 1, 1933 |
| 1,932,911 | Rolfe | Oct. 31, 1933 |
| 2,110,680 | Rowell | Mar. 8, 1938 |
| 1,241,275 | Porter et al. | Sept. 25, 1917 |
| 2,221,618 | Stickney | Nov. 12, 1940 |
| 1,927,346 | Lawrence | Sept. 19, 1933 |
| 2,029,282 | Serge | Jan. 28, 1936 |
| 2,115,795 | Warnke | May 3, 1938 |
| 2,168,290 | Green | Aug. 1, 1939 |
| 2,189,524 | Randolph et al. | Feb. 6, 1940 |
| 2,320,632 | McMaster | June 1, 1943 |
| 2,346,555 | Cobb | Apr. 11, 1944 |
| 2,306,213 | Grave et al. | Dec. 22, 1942 |
| 600,981 | Weston | Mar. 22, 1898 |

(Other references on following page)

UNITED STATES PATENTS

| Number | Name | Date |
|---|---|---|
| 644,859 | Hoyt | Mar. 6, 1900 |
| 2,149,442 | Kannenstine | Mar. 7, 1939 |

FOREIGN PATENTS

| Number | Country | Date |
|---|---|---|
| 13,647 | Great Britain | July 13, 1893 |
| 382,514 | Great Britain | Oct. 27, 1932 |
| 466,010 | Great Britain | May 20, 1937 |
| 549,446 | Germany | Apr. 27, 1932 |

OTHER REFERENCES

Publication entitled: The New Permanent Magnet Alloys, published in the magazine "Electronics," issue of May 1936, by McGraw-Hill Co. of N. Y. C., pages 30–32, 35. (In Div. 51.)

Publication entitled: "Alnico—Its Properties and Possibilities," published in the General Elec. Review by the G. E. Co. of Schenectady, N. Y., vol. 41, No. 12, pages 518–521, inc. (Dec. 1938). (Copy in Scientific Library.)